Patented Nov. 29, 1949

2,489,969

UNITED STATES PATENT OFFICE 2,489,969

BROMINE TRIFLUORIDE TREATMENT OF AROMATIC HALOCARBONS

Earl T. McBee, La Fayette, and Vincent V. Lindgren, West Lafayette, Ind., and Waldo B. Ligett, Detroit, Mich., assignors to Purdue Research Foundation, West Lafayette, Ind., a corporation of Indiana No Drawing. Application February 8, 1946, Serial No. 646,506

10 Claims. (Cl. 260—648)

This invention relates to a process for the preparation of fluorine-containing alicyclic halocarbons. More specifically, this invention pertains to the treatment of aromatic halocarbons with bromine trifluoride.

The fluorinating agent in our invention, i. e., bromine trifluoride, has long been available to any investigator of fluorine chemistry. It may be prepared by passing elemental fluorine into bromine in a copper vessel or other container resistant to the action of the said reactants at a temperature of about ten degrees centigrade until no further fluorine is absorbed. No limiting difficulties are encountered in its preparation.

An undesirable and definitely limiting characteristic of this fuming liquid, however, is its excessive reactivity with most organic matter. The fact that this liquid reacts explosively, or at best vigorously, when in contact with organic material, has proven a tremendous obstacle to investigators of the field. Due to the violent and explosive nature of most reactions between bromine trifluoride and organic matter, few successful experiments have been reported. Nutting (U. S. Patent 1,961,622, June 5, 1934) succeeded in reacting bromine trifluoride and carbon tetrachloride to produce fluorinated methanes, but any art regarding bromine trifluoride treatment of aromatic halocarbons is conspicuously absent.

Considerable difficulty, not present in the treatment of carbon tetrachloride, is encountered in the fluorination of aromatic compounds. Fluorinating agents apparently capable of reaction with monocarbon aliphatic halocarbons have proven themselves unadaptable to reactions with aromatic compounds. One major obstacle in the satisfactory fluorination of aromatic compounds has been the concurrent fission of carbon-carbon linkages or "fluorinolysis." Thus with elemental fluorine, the product obtained from a reaction with an aromatic compound consists largely of carbon tetrafluoride and other fluorinated breakdown products. The fluorinolysis problem has been extremely acute in the fluorination of alkyl-or aryl-substituted aromatic compounds, because of the splitting of the alkyl or aryl groups from the aromatic nucleus.

Our invention therefore concerns itself with a new and useful improvement in the process whereby aromatic halocarbons, including alkyl-substituted, aryl-substituted, and polycarbocyclic aromatic halocarbons, may be treated with bromine trifluoride under conditions which substantially circumvent the aforementioned difficulties and whereby we may produce various alicyclic halocarbons containing more fluorine and bromine than the starting aromatic halocarbon. A preferred embodiment of our invention resides in the reaction of bromine trifluoride and an aromatic halocarbon to produce high molecular weight bromine-and fluorine containing alicyclic halocarbons, containing the same number of carbon atoms as the aromatic halocarbon reacted in the process. The provision of a method whereby the above improvements may be accomplished is included among the objects of our invention.

We have also found that bromine trifluoride, under conditions prescribed for our invention, has exceptional utility in the following ways, heretofore unreported:

1. Bromine trifluoride adds fluorine and bromine to points of unsaturation in an aromatic halocarbon. Bromine enters the molecule by addition to a double bond, but the addition of bromine is not to be considered an undesirable effect of the bromine trifluoride fluorination process. Thus, we have found any bromine which is introduced to be easily replaceable, with fluorine, for example, by reaction with antimony pentafluoride, if such is desired.

2. Bromine trifluoride may be used to replace, with fluorine, other halogen atoms in an aromatic halocarbon.

In view of the above disclosures we include the provision of a process, whereby both (1) and (2) above may be accomplished, as a further object of our invention.

The dehalogenation of alicyclic halocarbons prepared by the bromine trifluoride treatment of aromatic halocarbons in some cases yields desirable aromatic or unsaturated cyclic fluorocarbons and fluorine-containing halocarbons. These compounds exhibit particular utility as dielectrics, heat transfer media, specific solvents, transformer fluids, insulating materials and the like. Some of these compounds are also useful in the preparation of fluorine-containing synthetic resins. It is, therefore, a further object of this invention to produce chemical intermediates for the preparation of these useful aromatic or unsaturated cyclic fluorocarbons and fluorine-containing halocarbons. Additional objects of our invention will become apparent from the following specification and claims.

In the practice of our invention, the aromatic halocarbon and bromine trifluoride may be contacted in any suitable manner. Thus, we may place the aromatic halocarbon in a suitable reaction container and add the bromine trifluoride thereto. It is sometimes more advantageous to apply the reverse procedure, adding the aromatic halocarbon to bromine trifluoride. Occasionally, it is of assistance to employ a liquid medium for the reaction, e. g., liquid bromine, although the purified aromatic halocarbon or mixture of halocarbons may be reacted directly with the bromine trifluoride.

After the reactants have been admixed, with reasonable precautions as outlined below, the mixture may be heated to a higher temperature, e. g., 90 to 175 degrees centigrade, and maintained at this temperature for a desirable interval, for example, three to thirty-six hours. Any excess bromine trifluoride may then be destroyed by the addition of some agent, e. g., cracked ice, cold water, sodium bicarbonate, et cetera, and the resulting fluorine-containing halocarbon may be washed with aqueous alkali, dissolved in a suitable solvent, dried, and the product recovered. If desired, the product may be reacted directly, without further purification, with another fluorinating agent, e. g., antimony pentafluoride or hydrogen fluoride, to increase further the amount of fluorine in the molecule. If a further reaction is not desired, the alicyclic halocarbon mixture may be treated for purification and extraction purposes as above, or in any other manner apparent to one skilled in the art.

Although the above conditions represent the optimum for our process, temparature ranges of considerably wider scope have been employed with success, e. g., the reaction proceeds satisfactorily between zero and 200 degrees centigrade and preferably between zero and 175 degrees centigrade with slightly more decomposition at the upper temperature levels.

A primary consideration in carrying out the process, regardless of the method by which reactants are contacted, is the exercise of reasonable precaution in preventing accumulation of unreacted starting materials. For this reason we employ constant agitation of the reaction mixture and introduce the reactant, which is selected for addition, in a portionwise manner, especially during the early stages of the reaction. For this reason, also, we find that cooling of the reaction mixture to low temperatures, e. g., zero degrees centigrade, and subsequent heating of the reaction at a higher temperature, for example, one hundred degrees centigrade, before and after each addition, respectively, is sometimes of particular advantage in causing each addition, especially the first additions, to react completely with the other reactant, thus circumventing undesirable accumulation with its contingent pyrolysis or explosion. After the reaction has proceeded for some time, it is usually permissible to increase the rate of addition of reactants because of the diluent effect of the bromine and the fluorinated product. However, in no case did we find omission of reasonable precautions advisable, either for the procurement of satisfactory products, or maximum safety of the operator.

The reaction vessel may be a nickel tube of considerable diameter and appreciable length, for example, 5.2 and 50 centimeters, respectively, sealed at one end. Such a tube, or one of similar construction, proved satisfactory in the illustrative examples herein. The means of agitation was, in most cases, a propeller stirrer, consisting of a motor-driven nickel rod with four blades appended thereto, which was inserted through the top of the tube. It was also found advantageous not to seal the tube at the top in case unexpected violence manifested itself during the reaction.

By adhering to the conditions as set forth above, we have obtained results which provide industry with a new, desirable, economical, and technically satisfactory method of fluorination.

The following examples illustrate a number of ways in which the principle of the invention may be applied, but are in no way to be construed as limiting the invention thereto.

Example 1

Bromine trifluoride (558 grams) was placed in a nickel tube 5.2 centimeters in diameter and 50 centimeters in length, closed at one end, and cooled to zero degrees centigrade. Hexachlorobenzene was introduced slowly and in a portionwise manner into the reaction tube at a rate of 100 grams per hour. Constant stirring of the mixture was accomplished by means of a motor-driven nickel rod inserted through the open top of the reaction tube and fitted with four blades, two inches apart on the rod. After each 100 gram quantity of hexachlorobenzene had been added, the tube was heated to 85 degrees centigrade, maintained at this temperature for about 15 minutes and then cooled to zero degrees centigrade. A total of 400 grams of hexachlorobenzene was charged to the reactor, representing a ratio of about three moles of bromine trifluoride to one mole of hexachlorobenzene. The entire reaction mixture was then heated at 100 degrees centigrade for four hours and poured into a copper pan. When excess bromine trifluoride was destroyed by the addition of cracked ice, the organic product solidified. This product became almost white when powdered, as occluded bromine was thus allowed to escape. The powdered product was then dissolved in ethanol and neutralized with dilute alkali. The organic material was precipitated by addition of water, separated, dissolved in ethyl ether and dried over Drierite. The purified product was crystallized from the ether solution and analyzed. The fluorine content was 28.2 per cent, chlorine 31.6 per cent, and bromine 26.9 per cent, corresponding approximately to a mixture of $C_6BrCl_4F_7$ and $C_6Br_2Cl_4F_6$. The product from a similar run contained 22.4 per cent fluorine and 43.3 per cent other halogen, calculated as chlorine.

Example 2

Pentachlorobenzotrifluoride was treated with bromine trifluoride in the nickel tube used in Example 1. Six hundred grams of pentachlorobenzotrifluoride was introduced into the tube, maintained at zero degrees centigrade, and 801 grams of bromine trifluoride was added slowly thereto with continuous stirring. After each 100 grams of bromine trifluoride had been added, the mixture was heated to 85 degrees centigrade, maintained at this temperature for about 15 minutes and then cooled to zero degrees centigrade. When 600 grams had been added, the reaction mixture was heated at 130 degrees centigrade for 36 hours. The remainder of the bromine trifluoride was then added, followed by three additional hours of heating at 130 degrees centigrade. Excess bromine trifluoride was destroyed with cracked ice and the organic product was washed with hot dilute ammonia and water. Water was removed by vacuum distillation and 740 grams of organic product was obtained. The product distilled up to 147 degrees centigrade at five millimeters of mercury pressure and contained 39.6 per cent fluorine and 35.6 per cent other halogen, calculated as chlorine. This corresponds approximately to a mixture of average composition $CF_3.C_6BrCl_3F_7$ and $CF_3.C_6Br_2Cl_3F_6$.

Example 3

Using the same reactor as in other runs of this type 332 grams of octachloronaphthalene was dissolved in 600 grams of bromine and cooled in an ice bath. During nine hours, 373 grams of bromine trifluoride was added thereto with continuous stirring. The mixture was then heated to 90 degrees centigrade and maintained at this temperature until no further bromine was evolved. Cooled again to ice temperature, 172 grams of bromine trifluoride was added to the reaction mixture over a four-hour period, the quantities of reactants representing, in all, a final mole ratio of 4.8 to 1. The reaction mixture was then heated at 90 degrees centigrade for four hours, at the end of which time no further bromine was evolved. Four hundred thirty-two grams of a colorless product was obtained, washed and dried as above-described, and submitted for analysis. The organic product contained 27.6 per cent fluorine and 38.5 per cent other halogen, calculated as chlorine. This corresponds approximately to $C_{10}Br_2Cl_8F_{10}$.

Example 4

Decachlorobiphenyl was reacted with bromine trifluoride in the nickel tube in a manner analogous to Example 1. Decachlorobiphenyl reacted less vigorously than hexachlorobenzene, thereby permitting more rapid addition to the bromine trifluoride. When 200 grams of decachlorobiphenyl had been added at ice temperature, the mixture was too viscous to permit stirring. Remaining organic material was therefore added at or above 50 degrees centigrade with vigorous stirring. The final mixture, comprising a ratio of six moles of bromine trifluoride to one mole of decachlorobiphenyl, was heated overnight at 160 degrees centigrade. The organic product, when pulverized in air, was a dirty-white solid weighing 594 grams. After washing and drying as previously described for hexachlorobenzene, a sample was recrystallized from alcohol, and contained, by analysis, 34.8 per cent fluorine, 35.7 per cent chlorine and 11.7 per cent bromine. This corresponds approximately to the compound $C_{12}BrCl_8F_{13}$, which contains 32.8 per cent fluorine, 37.6 per cent chlorine and 10.6 per cent bromine.

Example 5

Tetrachlorobis (trifluoromethyl) benzene was reacted with bromine trifluoride by dissolving one mole of the compound (352 grams) in 200 grams of liquid bromine, cooling the mixture in an ice bath, and adding bromine trifluoride (411 grams) thereto over a three-hour period. The reaction mixture was heated at 90 degrees centigrade for 19 hours and poured into a beaker where excess bromine trifluoride was destroyed with water. The washed organic product weighed 391 grams and contained 27.6 per cent chlorine and 45.0 per cent fluorine. A mixture of average composition $(CF_3)_2C_6BrCl_3F_6$ contains 27.85 per cent chlorine and bromine calculated as chlorine and 44.7 per cent fluorine.

Other aromatic halocarbons which may be treated in the process with bromine trifluoride include trichlorononafluoromesitylene, (trichloromethyl) pentachlorobenzene, partially brominated or fluorinated perhalo aromatic compounds, and the like.

Depending upon the type of aromatic halocarbon reacted with bromine trifluoride, the cyclic halocarbon separated will contain greater or lesser ratios of fluorine and bromine to other halogen, i. e., the product from a reaction between bromine trifluoride and an aromatic chlorocarbon may contain fluorine, chlorine, and bromine. Thus according to the nature of the reaction, depending upon the time and temperature employed, the amount of fluorine introduced into the molecule may be varied considerably.

In the following claims, alkyl-substituted and aryl-substituted aromatic halocarbons are to be understood to be entirely halocarbon in nature, no hydrogen being present in either the aromatic ring or in the alkyl or aryl substituent.

We claim:

1. The process for the simultaneous introduction of flourine and bromine into an aromatic hydrocarbon which includes: mixing bromine trifluoride with an aromatic halocarbon; maintaining the reactants at a temperature between about zero degrees and about 200 degrees centigrade; and separating a more highly saturated fluorine-containing halocarbon, containing more fluorine and bromine than the starting aromatic halocarbon and containing the same number of carbon atoms as the starting aromatic halocarbon, from the reaction product.

2. The process for the simultaneous introduction of fluorine and bromine into an aromatic halocarbon which includes: mixing bromine trifluoride with an aromatic halocarbon, maintaining the reaction temperature between about zero degrees and about 175 degrees centigrade, and maintaining the reactants in contact until saturation, with halogen, of at least one double bond in the starting aromatic halocarbon and until the fluorine and bromine content of the product is greater than that of the starting aromatic halocarbon.

3. The process of claim 2, wherein the starting aromatic halocarbon is a chlorine-containing halocarbon.

4. The process of claim 2, wherein the starting aromatic halocarbon is an aromatic chlorocarbon.

5. The process of claim 2, wherein the starting aromatic halocarbon is an alkyl-substituted aromatic halocarbon.

6. The process of claim 2, wherein the starting aromatic halocarbon is a polycarbocyclic anellated aromatic halocarbon.

7. The process of claim 2, wherein the starting aromatic halocarbon is pentachlorobenzotrifluoride.

8. The process of claim 2, wherein the starting aromatic halocarbon is octachloronaphthalene.

9. The process of claim 2, wherein the starting aromatic halocarbon is hexachlorobenzene.

10. The process of claim 2, wherein the starting reactants are admixed at a temperature below about room temperature, and are thereafter heated in admixture at a temperature between about room temperature and 175 degrees centigrade.

EARL T. McBEE.
VINCENT V. LINDGREN.
WALDO B. LIGETT.

REFERENCES CITED

The following references are of record in the file of this patent:

UNITED STATES PATENTS

| Number | Name | Date |
|---|---|---|
| 1,961,622 | Nutting et al. | June 5, 1934 |
| 2,013,030 | Calcott et al. | Sept. 3, 1935 |
| 2,013,035 | Daudt et al. | Sept. 3, 1935 |
| 2,238,242 | Balon et al. | Apr. 15, 1941 |

OTHER REFERENCES

Lebeau, Ann. Chim. Phys. (8), vol. 9 (1906), pages 258 and 262.

Certificate of Correction

Patent No. 2,489,969

November 29, 1949

EARL T. McBEE ET AL.

It is hereby certified that error appears in the printed specification of the above numbered patent requiring correction as follows:

Column 6, line 11, for the word "hydrocarbon" read *halocarbon*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*